Figure 1:
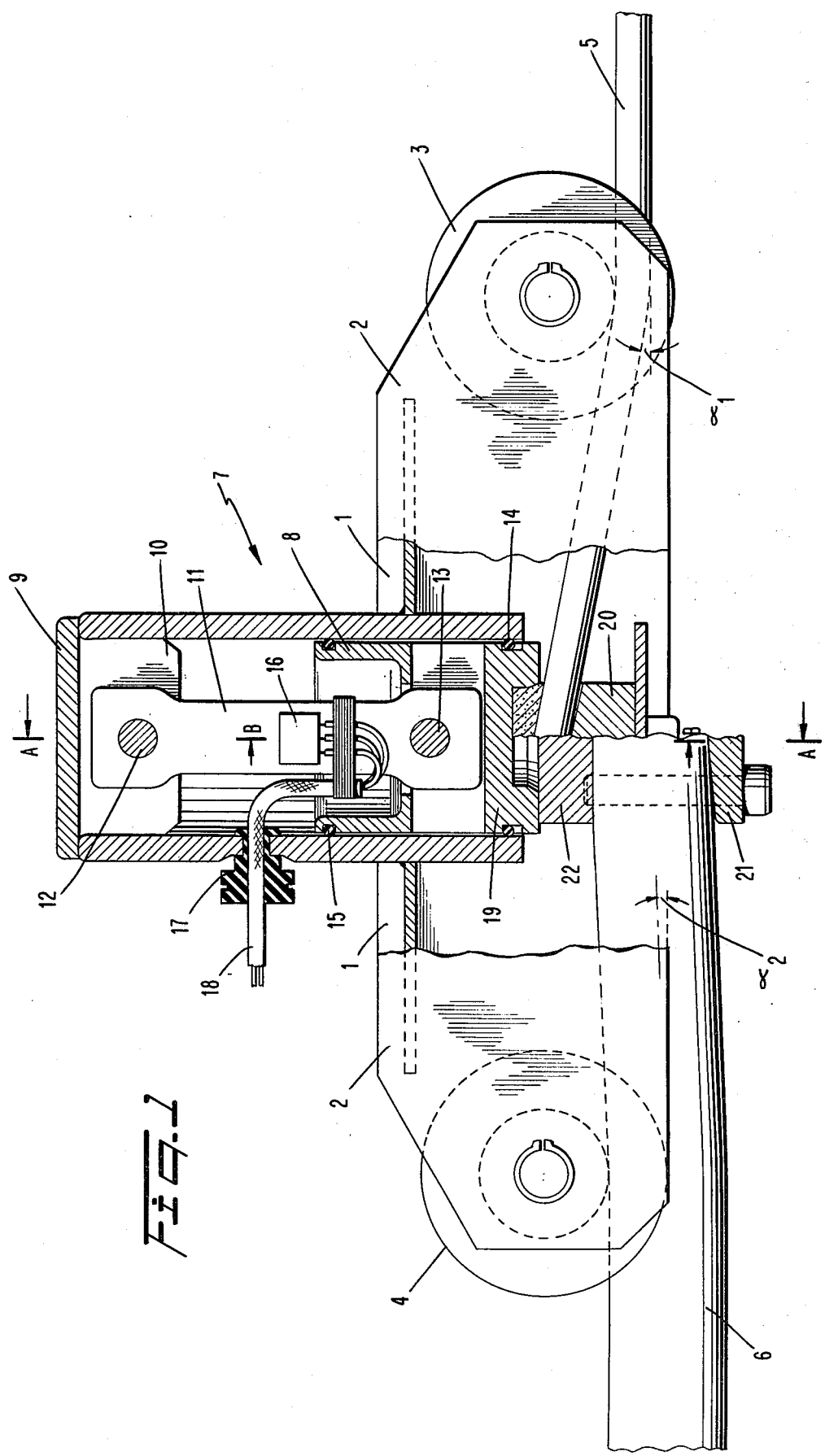

United States Patent [19]

Öhrnell et al.

[11] 4,433,586
[45] Feb. 28, 1984

[54] ELECTRONIC CABLE LOAD GAUGE

[75] Inventors: Hakan Öhrnell; Leif Näslund, both of Karlstad, Sweden

[73] Assignee: Handelsbolaget Ohrnell-Teknik, Karlstad, Sweden

[21] Appl. No.: 362,753

[22] Filed: Mar. 29, 1982

[30] Foreign Application Priority Data

Apr. 7, 1981 [SE] Sweden .............................. 8102217

[51] Int. Cl.³ ............................................. G01L 5/10
[52] U.S. Cl. ............................................. 73/862.48
[58] Field of Search .......... 73/862.48, 862.64, 862.65, 73/862.66, 862.67

[56] References Cited

U.S. PATENT DOCUMENTS 2,645,121  7/1953  Scott .......................... 73/862.48 X
2,814,946 12/1957  Harris, Jr. ........................ 73/862.65

Primary Examiner—Jerry W. Myracle
Attorney, Agent, or Firm—Burns, Doane, Swecker & Mathis

[57] ABSTRACT

An electronic transmitter element of the type cable load gauge for measuring the tension on a stretched flexible cable to generate an electric signal corresponding to the load acting on the cable. The transmitter element comprises a frame portion (1,2) with two bearing members (3,4) being disposed at opposite ends of the frame portion and preferably made in the form of rollers (4) for engagement with the tensioned cable (5,6) at one side thereof, a force detecting member (8,10,11) being disposed substantially midway between the bearing members and engaging the opposite side of the cable in a direction perpendicular to its orientations, thereby forming a breaking point in which a force perpendicular to the cable is detectable. The force detecting member comprises a measuring bar (11) with strain gauges (16), one end of the bar being connected to the frame portion (10,12) and the other end being connected with a movable portion (8,19,20) to which the cable is attached. The measuring rod (11) will be subjected to tensile stress when the force detecting member is affected by a tension load effecting the cable.

1 Claim, 3 Drawing Figures

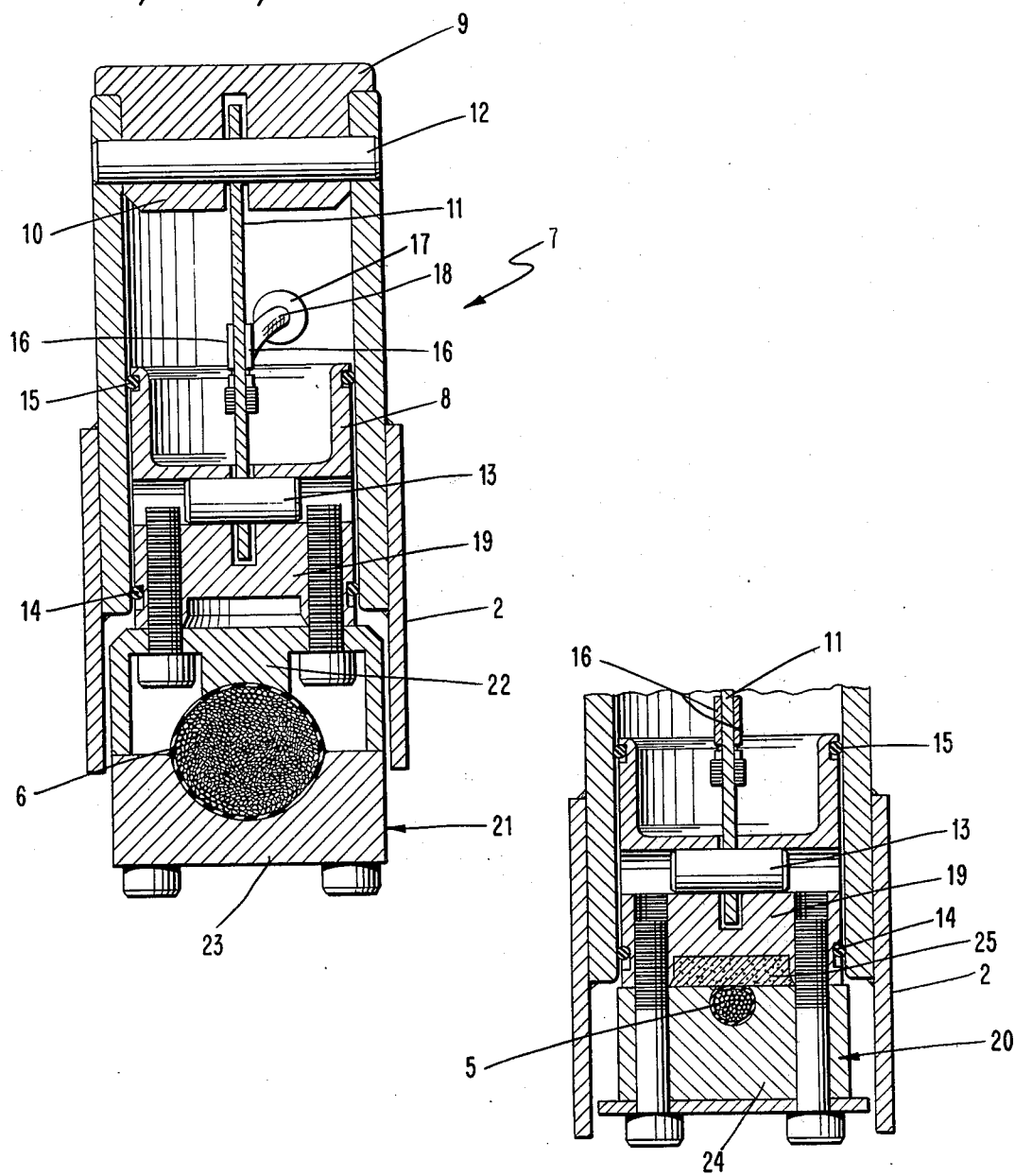

ELECTRONIC CABLE LOAD GAUGE

The present invention relates to an electric transmitter element in the for of a cable load gauge for measuring the tension on a stretched cable or wire and generating an electric signal corresponding to the load effecting the cable. The transmitter element comprises a frame portion with two cable bearing members at opposite ends of the frame for engagement with the tensioned cable at one side thereof, and a central portion between said bearing members engagingthe opposite side of the cable to form a breaking point in which a force is generated generally transversely to the cable and corresponding to the tension load in the same.

Transmitter elements of the kind mentioned above are previously known and used in connection with different types of lifting devices such as telfers, cranes, travelling cranes and similar. Such arrangements are known for example through SE-A Nos. 7310533-0 and 7502923-1, U.S. Pat. Nos. 2,795,136 and 2,996,914. The two firstmentioned citations relate to overload protective devices which are intended to prevent overload in cranes and similar lifting devices utilizing cables. Some of these prior art gauges utilize spring loaded tension gauges to measure the force acting on the cable transversely to its orientation of travel. However, such structures utilizing spring loaded gauges have very poor accuracy and are therefore hitherto only used as overload protection devices or in measuring only requiring a rough estimation of the load being handled. The cable load gauge described in for instance U.S. Pat. No. 2,795,136 utilizes a force measuring member comprising a force detecting device in the form of a bar which is positioned in parallel with the cable and is subjected to bending moments when the cable is under tension load. The problem in these later structures is that the ends of the bar have to be pivotally supported if the deflection of the center of the bar should accurately correspond to the load forces acting on it in order to obtain a correct electric signal from the strain gauges placed on the inside and outside surfaces of the bar. Such pivotal support is disclosed in SE-A No. 7614175-3. However, it has appeared in practice to be difficult to attain sufficient accuracy in these prior constructions to use them in precision weighing. The design has moreover become too complicated and the measuring device is consequently expensive in manufacture which also strongly affects its commercial use.

The object of this invention has been the provision of a structure in which the abovementioned drawbacks have been eliminated and which can be used in weighing operations requiring high degree of precision.

A further object of this invention has been the provision of a structure which is simple and consequently cheap in manufacture.

These objects are realized according to the invention substantially by the fact that the force detecting member comprises a measuring bar which is arrange generally transversely to the cable, one end of which is connected to the frame portion and the other end is connected to a movable portion which is displaceable generally transversely to the cable, said movable portion being provided with clamping means for attachment of said cable, whereby said measuring bar will be subjected to tensile stress corresponding to the tension load on the cable.

Other objects of this invention will become apparent from the following description and accompanying drawings disclosing an embodiment of the invention in which FIG. 1 is a sectional sideview of a cable load gauge according to the invention showing two different cable alternatives, FIG. 2 is a cross-sectional view taken along the line A—A of FIG. 1, and FIG. 3 is a cross-sectional view taken along the line B—B of FIG. 1.

As appears from FIG. 1 a cable load gauge according to the invention comprises a frame portion having two lateral plates 1 and 2 with end portions in which cable bearing members in the form of rollers 3 and 4 are pivotally supported. The cable which travels over these rollers can either be thin or thick and the right part of the Figure discloses an embodiment in which the cable load gauge is adapted to a thin cable 5 whereas the left portion discloses an embodiment for a thick cable 6. The frame portion moreover comprises a cylindrical portion 7 in which a piston 8 is movable in a direction generally transversely to the cable. The cylinder 7 is at the top provided with a cover 9 and an attachment member 10 which supports one end of a measuring bar 11 which is rotatably mounted on a pin 12 in said member 10. The opposite end is pivotally mounted in the piston 8 on a piston pin 13. The peripheral portion of the piston is provided with grooves for packings 14, 15 to prevent dirt and moist from penetrating into the cylinder. The measuring bar 11 is provided with strain gauges 16 which are secured on both sides of the bar. The movable piston 8 forms part of a force detecting member and its outer end 19 forms a bracket for clamping members 20 and 21, respectively, for clamping cables of different size to the piston. There is a hole in the cylinder wall for a cable bushing 17 for the electric cable 18 which is connected to the strain gauges 16. The cable 18 is connected to an electronic circuit, of conventional design as disclosed in the citations referred to in the opening part of the description, in which the signal from the transmitter is converted into signals which either control a relay breaking the current supply to the lifting device or are supplied to a display showing the actual load on the cable. The electronic circuit also comprises potentiometers for balancing the weighing equipment and for calibrating the overload protective device and/or the weighing device.

Fig. 2 shows an embodiment of the invention from the view taken along the line A—A of FIG. 1 which means the left part of the Figure in which the transmitter element is attached to a thick cable 6. FIG. 3 and the right part of FIG. 1 disclose an embodiment where the transmitter element is attached to a thin cable 5. Since the measuring bar 11 is adapted to tensile stresses within a certain measuring range it will be necessary to change the angle of deflection of the cable if there are great differences in the load to be handled by the crane. A change of the angle of deflection will also alter the force acting on the force detecting member which will be affected less at small angles of deflection than at greater angles.

In the left part of FIG. 1 the cable 6 is fairly thick and the angle of deflection $a_2$ is therefore less than in the embodiment shown in the right part of FIG. 1 where the angle of deflection has the greater value $a_1$.

The clamping member 21 shown on FIG. 2 comprises an intermediate portion 22 which is bolted to the piston 8 and a clamping portion 23 which is bolted to the intermediate portion. Tightening of the bolts against the intermediate portion 22 will draw the clamping portion 23 against the cable. The angle of deflection is consequently decreased by inserting an intermediate portion 22 between the clamping portion 23 and the piston 8.

In the embodiment shown on FIG. 3 the angle of deflection $\alpha_1$ is increased by removing the clamping member 21 and using a clamping portion 24 which is adapted to the thin cable 5 and which is threaded directly to the outer end 19 of the piston 8. The outer surface of the end portion 19 is provided with a recess for a steel-plastic bushing 25 or a rubber bushing against which the thinner cable 5 is tightened by means of the bolts in the clamping portion 24.

We claim:

1. An electronic cable load gauge for measuring the tension on a stretched cable or wire and generating an electric signal corresponding to the load effecting the cable, which gauge comprises a frame portion with two cable bearing members at opposite ends of the frame for engagement with the tensioned cable at one side thereof and a central portion between said bearing members engaging the opposite side of the cable to form a breaking point in which a force is generated generally transversely to the cable and corresponding to the tension load in the same, characterized in that the force detecting member comprises a measuring bar, which is arranged generally transversely to the cable, one end of which is connected to the frame portion and the other end is connected to a movable portion which is displaceable generally transversely to the cable, said movable portion being provided with clamping means for attachment of said cable, whereby said measuring bar will be subjected to tensile stress corresponding to the tension load in the cable, the movable portion which is displaceable generally transversely to the cable comprises a piston which is slidable in a cylinder-formed part of the frame portion, and the measuring bar is made in the form of a piston rod which in one end is rotatably attached to the piston and in the other end to the frame portion.

* * * * *